United States Patent Office 3,445,422
Patented May 20, 1969

3,445,422
ORGANIC SUBSTRATES CONTAINING BORATE OF POLYALKYL - POLYHYDROXYALKYL - AL - KYLENEPOLYAMINE
Henryk A. Cyba, Evanston, Ill., assignor to Universal Oil Products Company, Des Plaines, Ill., a corporation of Delaware
No Drawing. Original application May 12, 1964, Ser. No. 366,921, now Patent No. 3,301,888, dated Jan. 31, 1967. Divided and this application June 22, 1966, Ser. No. 559,410
Int. Cl. C08f 45/60
U.S. Cl. 260—45.9
7 Claims

ABSTRACT OF THE DISCLOSURE

Organic substrates such as plastics and rubber containing a stabilizing concentration of a borate of a polyalkyl-polyhydroxyalkyl-alkylenepolyamine. For example, polypropylene containing 1% by weight of borate of N,N'-di - sec - octyl - N,N' - di - (2 - hydroxyethyl) - ethylenediamine exhibits improved weathering properties.

This is a division of copending application Ser. No. 366,921, filed May 12, 1964 now U.S. Patent No. 3,301,188 issued Jan. 31, 1967, and relates to a novel method of benefiting organic substrates by incorporating therein a novel composition of matter comprising a borate of a particular polyalkyl-polyhydroxyalkyl-alkylenepolyamine.

The novel composition of matter is prepared by the reaction of a borylating agent with the particular polyalkyl-polyhydroxyalkyl-alkylenepolyamine. The exact structure of the product or products formed in this reaction has not been established and may comprise one or more of several possible compounds as will be hereinafter set forth in more detail. Regardless of the specific composition thereof, the product is a new composition of matter and possesses varied utility as will be hereinafter set forth.

As hereinbefore set forth, the composition of matter of the present invention is a borate of a particular polyalkyl-polyhydroxyalkyl-alkylenepolyamine. The particular polyalkyl-polyhydroxyalkyl-alkylenepolyamine is illustrated by the following formula:

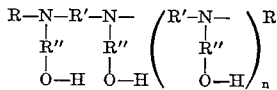

where R is an alkyl group of from 4 to about 50 carbon atoms, R' is an alkylene group of from 2 to about 6 carbon atoms, R" is an alkylene group of from 2 to about 6 carbon atoms and n is an integer of from 0 to 4.

From the above formula, it will be seen that it is essential that each nitrogen atom contains a hydroxyalkyl group attached thereto and that the terminal nitrogen aoms each contain an alkyl radical attached thereto.

Referring to the formula hereinbefore set forth, when n is zero, the compound is an N,N'-dialkyl-N-hydroxyalkyl-aminoalkyl-alkanolamine, which also may be named N,N' - dialkyl - N,N' - dihydroxyalkyl - alkylenediamine. The alkyl groups preferably are secondary alkyl groups and contain from 4 to about 50 carbon atoms each and more particularly from 4 to 20 carbon atoms each. Illustrative preferred compounds in this embodiment include N,N'-di-sec-butyl-N-hydroxyethyl-aminoethyl-ethanolamine,
N,N'-di-sec-pentyl-N-hydroxyethyl-aminoethyl-ethanolamine,
N,N'-di-sec-hexyl-N-hydroxyethyl-aminoethyl-ethanolamine,
N,N'-di-sec-heptyl-N-hydroxyethyl-aminoethyl-ethanolamine,
N,N'-di-sec-octyl-N-hydroxyethyl-aminoethyl-ethanolamine,
N,N'-di-sec-nonyl-N-hydroxyethyl-aminoethyl-ethanolamine,
N,N'-di-sec-decyl-N-hydroxyethyl-aminoethyl-ethanolamine,
N,N'-di-sec-undecyl-N-hydroxyethyl-aminoethyl-ethanolamine,
N,N'-di-sec-dodecyl-N-hydroxyethyl-aminoethyl-ethanolamine,
N,N'-di-sec-tridecyl-N-hydroxyethyl-aminoethyl-ethanolamine,
N,N'-di-sec-tetradecyl-N-hydroxyethyl-aminoethyl-ethanolamine,
N,N'-di-sec-pentadecyl-N-hydroxyethyl-aminoethyl-ethanolamine,
N,N'-di-sec-hexadecyl-N-hydroxyethyl-aminoethyl-ethanolamine,
N,N'-di-sec-heptadecyl-N-hydroxyethyl-aminoethyl-ethanolamine,
N,N'-di-sec-octadecyl-N-hydroxyethyl-aminoethyl-ethanolamine,
N,N-di-sec-nonadecyl-N-hydroxyethyl-aminoethyl-ethanolamine,
N,N'-di-sec-eicosyl-N-hydroxyethyl-aminoethyl-ethanolamine, etc.

The above compounds are illustrative of compounds in which R' and R" each contain two carbon atoms. It is understood that corresponding compounds are included in which one or both of the groups containing two carbon atoms are replaced by a group containing 3, 4, 5 or 6 carbon atoms.

Referring again to the above formula, when n is 1, the compounds of the present invention are named N,N-bis-[N - alkyl - N - (hydroxyalkyl) - aminoalkyl] - alkanolamine which also can be named $N^1$, $N^3$-dialkyl-$N^1$,$N^2$,$N^3$-tri-(hydroxyalkyl)-diethylenetriamine. Here again, it will be noted that each terminal nitrogen contains an alkyl group and each nitrogen atom contains a hydroxyalkyl group attached thereto. Illustrative preferred compounds in this embodiment include N,N-bis-[N-sec-butyl-N-(2-hydroxyethyl)-aminoethyl]-ethanolamine,
N,N-bis-[N-sec-pentyl-N-(2-hydroxyethyl)-aminoethyl]-ethanolamine,
N,N-bis-[N-sec-hexyl-N-(2-hydroxyethyl)-aminoethyl]-ethanolamine,
N,N-bis-[N-sec-heptyl-N-(2-hydroxyethyl)-aminoethyl]-ethanolamine,
N,N-bis-[N-sec-octyl-N-(2-hydroxyethyl)-aminoethyl]-ethanolamine,
N,N-bis-[N-sec-nonyl-N-(2-hydroxyethyl)-aminoethyl]-ethanolamine,
N,N-bis-[N-sec-decyl-N-(2-hydroxyethyl)-aminoethyl]-ethanolamine,
N,N-bis-[N-sec-undecyl-N-(2-hydroxyethyl)-aminoethyl]-ethanolamine,
N,N-bis-[N-sec-dodecyl-N-(2-hydroxyethyl)-aminoethyl]-ethanolamine,
N,N-bis-[N-sec-tridecyl-N-(2-hydroxyethyl)-aminoethyl]-ethanolamine,
N,N-bis-[N-sec-tetradecyl-N-(2-hydroxyethyl)-aminoethyl]-ethanolamine,
N,N-bis-[N-sec-pentadecyl-N-(2-hydroxyethyl)-aminoethyl]-ethanolamine,
N,N-bis-[N-sec-hexadecyl-N-(2-hydroxyethyl)-aminoethyl]-ethanolamine, N,N-bis-[N-sec-heptadecyl-N-(2-hydroxyethyl)-aminoethyl]-ethanolamine,
N,N-bis-[N-sec-octadecyl-N-(2-hydroxyethyl)-aminoethyl]-ethanolamine,
N,N-bis-[-sec-nonadecyl-N-(2-hydroxyethyl)-aminoethyl]-ethanolamine,
N,N-bis-[N-sec-eicosyl-N-(2-hydroxyethyl)-aminoethyl]-ethanolamine, etc.

Here again, one or both of the groups containing two carbon atoms may be replaced by a group containing 3, 4, 5 or 6 carbon atoms.

When $n$ is 2, the compound is an $N^1,N^4$-dialkyl-$N^1,N^2,N^3,N^4$-tetrahydroxyalkyl-alkylenepolyamine. Illustrative compounds in this embodiment include $N^1,N^4$-di-sec-butyl-$N^1,N^2,N^3,N^4$-tetra-(2-hydroxyethyl)-triethylenetetramine,
$N^1,N^4$-di-sec-pentyl-$N^1,N^2,N^3,N^4$-tetra-(2-hydroxyethyl)-triethylenetetramine,
$N^1,N^4$-di-sec-hexyl-$N^1,N^2,N^3,N^4$-tetra-(2-hydroxyethyl)-triethylenetetramine,
$N^1,N^4$-di-sec-heptyl-$N^1,N^2,N^3,N^4$-tetra-(2-hydroxyethyl)-triethylenetetramine,
$N^1,N^4$-di-sec-octyl-$N^1,N^2,N^3,N^4$-tetra-(2-hydroxyethyl)-triethylenetetramine,
$N^1,N^4$-di-sec-nonyl-$N^1,N^2,N^3,N^4$-tetra-(2-hydroxyethyl)-triethylenetetramine,
$N^1,N^4$-di-sec-decyl-$N^1,N^2,N^3,N^4$-tetra-(2-hydroxyethyl)-triethylenetetramine,
$N^1,N^4$-di-sec-undecyl-$N^1,N^2,N^3,N^4$-tetra-(2-hydroxyethyl)-triethylenetetramine,
$N^1,N^4$-di-sec-dodecyl-$N^1,N^2,N^3,N^4$-tetra-(2-hydroxyethyl)-triethylenetetramine,
$N^1,N^4$-di-sec-tridecyl-$N^1,N^2,N^3,N^4$-tetra-(2-hydroxyethyl)-triethylenetetramine,
$N^1,N^4$-di-sec-tetradecyl-$N^1,N^2,N^3,N^4$-tetra-(2-hydroxyethyl)-triethylenetetramine,
$N^1,N^4$-di-sec-pentadecyl-$N^1,N^2,N^3,N^4$-tetra-(2-hydroxyethyl)-triethylenetetramine,
$N^1,N^4$-di-sec-hexadecyl-$N^1,N^2,N^3,N^4$-tetra-(2-hydroxyethyl)-triethylenetetramine,
$N^1,N^4$-di-sec-heptadecyl-$N^1,N^2,N^3,N^4$-tetra-(2-hydroxyethyl)-triethylenetetramine,
$N^1,N^4$-di-sec-octadecyl-$N^1,N^2,N^3,N^4$-tetra-(2-hydroxyethyl)-triethylenetetramine,
$N^1,N^4$-di-sec-nonadecyl-$N^1,N^2,N^3,N^4$-tetra-(2-hydroxyethyl)-triethylenetetramine,
$N^1,N^4$-di-sec-eicosyl-$N^1,N^2,N^3,N^4$-tetra-(2-hydroxyethyl)-triethylenetetramine, etc.

Here again, it is understood that one or both of the groups containing two carbon atoms may be replaced by a group containing 3, 4, 5 or 6 carbon atoms.

Referring again to the above formula, when $n$ is 3, the compound will be $N^1,N^5$-dialkyl-$N^1,N^2,N^3,N^4,N^5$-penta-(hydroxyalkyl)-alkylenepolyamine. Illustrative preferred compounds in this embodiment include $N^1,N^5$-di-sec-butyl-$N^1,N^2,N^3,N^4,N^5$-penta-(2-hydroxyethyl)-tetraethylenepentamine,
$N^1,N^5$-di-sec-pentyl-$N^1,N^2,N^3,N^4,N^5$-penta-(2-hydroxyethyl)-tetraethylenepentamine,
$N^1,N^5$-di-sec-hexyl-$N^1,N^2,N^3,N^4,N^5$-penta-(2-hydroxyethyl)-tetraethylenepentamine,
$N^1,N^5$-di-sec-heptyl-$N^1,N^2,N^3,N^4,N^5$-penta-(2-hydroxyethyl)-tetraethylenepentamine,
$N^1,N^5$-di-sec-octyl-$N^1,N^2,N^3,N^4,N^5$-penta-(2-hydroxyethyl)-tetraethylenepentamine,
$N^1,N^5$-di-sec-nonyl-$N^1,N^2,N^3,N^4,N^5$-penta-(2-hydroxyethyl)-tetraethylenepentamine,
$N^1,N^5$-di-sec-decyl-$N^1,N^2,N^3,N^4,N^5$-penta-(2-hydroxyethyl)-tetraethylenepentamine,
$N^1,N^5$-di-sec-undecyl-$N^1,N^2,N^3,N^4,N^5$-penta-(2-hydroxyethyl)-tetraethylenepentamine,
$N^1,N^5$-di-sec-dodecyl-$N^1,N^2,N^3,N^4,N^5$-penta-(2-hydroxyethyl)-tetraethylenepentamine,
$N^1,N^5$-di-sec-tridecyl-$N^1,N^2,N^3,N^4,N^5$-penta-(2-hydroxyethyl)-tetraethylenepentamine,
$N^1,N^5$-di-sec-tetradecyl-$N^1,N^2,N^3,N^4,N^5$-penta(2-hydroxyethyl)-tetraethylenepentamine,
$N^1,N^5$-di-sec-pentadecyl-$N^1,N^2,N^3,N^4,N^5$-penta-(2-hydroxyethyl)-tetraethylenepentamine,
$N^1,N^5$-di-sec-hexadecyl-$N^1,N^2,N^3,N^4,N^5$-penta-(2-hydroxyethyl)-tetraethylenepentamine,
$N^1,N^5$-di-sec-heptadecyl-$N^1,N^2,N^3,N^4,N^5$-penta-(2-hydroxyethyl)-tetraethylenepentamine,
$N^1,N^5$-di-sec-octadecyl-$N^1,N^2,N^3,N^4,N^5$-penta-(2-hydroxyethyl)-tetraethylenepentamine,
$N^1,N^5$-di-sec-nonadecyl-$N^1,N^2,N^3,N^4,N^5$-penta-(2-hydroxyethyl)-tetraethylenepentamine,
$N^1,N^5$-di-sec-eicosyl-$N^1,N^2,N^3,N^4,N^5$-penta-(2-hydroxyethyl)-tetraethylenepentamine, etc.

Here again, it is understood that one or both of the groups containing two carbon atoms may be replaced by a group containing 3, 4, 5 or 6 carbon atoms.

Referring again to the above formula, when $n$ is 4, the compound will be $N^1,N^6$-dialkyl-$N^1,N^2,N^3,N^4,N^5,N^6$-hexa-(hydroxyalkyl)-pentaethylenehexamine. Illustrative preferred compounds in this embodiment include $N^1,N^6$-di-sec-butyl-$N^1,N^2,N^3,N^4,N^5,N^6$-hexa-(2-hydroxyethyl)-pentaethylenehexamine,
$N^1,N^6$-di-sec-pentyl-$N^1,N^2,N^3,N^4,N^5,N^6$-hexa-(2-hydroxyethyl)-pentaethylenehexamine,
$N^1,N^6$-di-sec-hexyl-$N^1,N^2,N^3,N^4,N^5,N^6$-hexa-(2-hydroxyethyl)-pentaethylenehexamine,
$N^1,N^6$-di-sec-heptyl-$N^1,N^2,N^3,N^4,N^5,N^6$-hexa-(2-hydroxyethyl)-pentaethylenehexamine,
$N^1,N^6$-di-sec-octyl-$N^1,N^2,N^3,N^4,N^5,N^6$-hexa-(2-hydroxyethyl)-pentaethylenehexamine,
$N^1,N^6$-di-sec-nonyl-$N^1,N^2,N^3,N^4,N^5,N^6$-hexa-(2-hydroxyethyl)-pentaethylenehexamine,
$N^1,N^6$-di-sec-decyl-$N^1,N^2,N^3,N^4,N^5,N^6$-hexa-(2-hydroxyethyl)-pentaethylenehexamine,
$N^1,N^6$-di-sec-undecyl-$N^1,N^2,N^3,N^4,N^5,N^6$-hexa-(2-hydroxyethyl)-pentaethylenehexamine,
$N^1,N^6$-di-sec-dodecyl-$N^1,N^2,N^3,N^4,N^5,N^6$-hexa-(2-hydroxyethyl)-pentaethylenehexamine,
$N^1,N^6$-di-sec-tridecyl-$N^1,N^2,N^3,N^4,N^5,N^6$-hexa-(2-hydroxyethyl)-pentaethylenehexamine,
$N^1,N^6$-di-sec-tetradecyl-$N^1,N^2,N^3,N^4,N^5,N^6$-hexa-(2-hydroxyethyl)-pentaethylenehexamine,
$N^1,N^6$-di-sec-pentadecyl-$N^1,N^2,N^3,N^4,N^5,N^6$-hexa-(2-hydroxyethyl)-pentaethylenehexamine,
$N^1,N^6$-di-sec-hexadecyl-$N^1,N^2,N^3,N^4,N^5,N^6$-hexa-(2-hydroxyethyl)-pentaethylenehexamine,
$N^1,N^6$-di-sec-heptadecyl-$N^1,N^2,N^3,N^4,N^5,N^6$-hexa-(2-hydroxyethyl)-pentaethylenehexamine,
$N^1,N^6$-di-sec-octadecyl-$N^1,N^2,N^3,N^4,N^5,N^6$-hexa-(2-hydroxyethyl)-pentaethylenehexamine,
$N^1,N^6$-di-sec-nonadecyl-$N^1,N^2,N^3,N^4,N^5,N^6$-hexa-(2-hydroxyethyl)-pentaethylenehexamine,
$N^1,N^6$-di-sec-eicosyl-$N^1,N^2,N^3,N^4,N^5,N^6$-hexa-(2-hydroxyethyl)-pentaethylenehexamine, etc.

Here, again, it is understood that one or both of the groups containing two carbon atoms may be replaced by a group containing 3, 4, 5 or 6 carbon atoms.

As hereinbefore set forth, in a preferred embodiment the alkyl groups attached to the terminal nitrogen atoms are secondary alkyl groups. In another embodiment, these groups may be cycloalkyl groups and particularly cyclohexyl, alkylcyclohexyl, dialkylcyclohexyl, etc., although they may comprise cyclobutyl, cyclopentyl, cycloheptyl, cyclooctyl, etc., and alkylated derivatives thereof. The cycloalkyl groups may be considered as corresponding to secondary alkyl groups. The secondary alkyl configuration is definitely preferred although, when desired, the alkyl groups attached to the terminal nitrogen atoms may be normal alkyl groups but not necessarily with equivalent results.

The polyalkyl-polyhydroxyalkyl-alkylenepolyamine is prepared by first reductively alkylating an alkylenepolyamine and then subjecting the resultant alkylenepolyamine containing alkyl groups attached to the terminal nitrogen atoms to oxyalkylenation. Accordingly, the oxyalkylenation is performed on alkylenepolyamines containing only secondary nitrogen atoms. There are no primary nitrogen atoms available and, therefore, will not result in the formation of a nitrogen atom containing two hydroxyalkyl groups.

The alkylenepolyamines to be subjected to reductive alkylation include ethylenediamine, diethylenetriamine, triethylenetetramine, tetraethylenepentamine, pentaethylenehexamine and corresponding alkylenepolyamines in which the ethylene group or groups are replaced by propylene, butylene, pentylene and/or hexylene groups. In order to prepare the preferred compounds in which the alkyl groups are of secondary alkyl groups, the reductive alkylation is effected using a ketone. Any suitable ketone may be used and will be selected to produce the desired secondary alkyl groups to be attached to the terminal nitrogen atoms. Illustrative preferred ketones include methyl ethyl ketone, methyl propyl ketone, methyl butyl ketone, methyl pentyl ketone, methyl hexyl ketone, methyl heptyl ketone, methyl octyl ketone, methyl nonyl ketone, methyl decyl ketone, methyl undecyl ketone, methyl dodecyl ketone, methyl tridecyl ketone, methyl tetradecyl ketone, methyl pentadecyl ketone, methyl hexadecyl ketone, methyl heptadecyl ketone, methyl octadecyl ketone, etc., diethyl ketone, ethyl propyl ketone, ethyl butyl ketone, ethyl pentyl ketone, ethyl hexyl ketone, ethyl heptyl ketone, ethyl octyl ketone, ethyl nonyl ketone, ethyl decyl ketone, ethyl undecyl ketone, ethyl dodecyl ketone, ethyl tridecyl ketone, ethyl tetradecyl ketone, ethyl pentadecyl ketone, ethyl hexadecyl ketone, ethyl heptadecyl ketone, etc., dipropyl ketone, propyl butyl ketone, propyl pentyl ketone, propyl hexyl ketone, propyl heptyl ketone, propyl octyl ketone, propyl nonyl ketone, propyl decyl ketone, propyl undecyl ketone, propyl dodecyl ketone, propyl tridecyl ketone, propyl tetradecyl ketone, propyl pentadecyl ketone, propyl hexadecyl ketone, etc., dibutyl ketone, butyl pentyl ketone, butyl hexyl ketone, butyl heptyl ketone, butyl octyl ketone, butyl nonyl ketone, butyl decyl ketone, butyl undecyl ketone, butyl dodecyl ketone, butyl tridecyl ketone, butyl tetradecyl ketone, butyl pentadecyl ketone, etc., dipentyl ketone, pentyl hexyl ketone, pentyl heptyl ketone, pentyl octyl ketone, pentyl nonyl ketone, pentyl decyl ketone, pentyl undecyl ketone, pentyl dodecyl ketone, pentyl tridecyl ketone, pentyl tetradecyl ketone, etc., dihexyl ketone, hexyl heptyl ketone, hexyl octyl ketone, hexyl nonyl ketone, hexyl decyl ketone, hexyl undecyl ketone, hexyl dodecyl ketone, hexyl tridecyl ketone, etc., diheptyl ketone, heptyl octyl ketone, heptyl nonyl ketone, heptyl decyl ketone, heptyl undecyl ketone, heptyl dodecyl ketone, etc., dioctyl ketone, octyl nonyl ketone, octyl decyl ketone, octyl undecyl ketone, etc., dinonyl ketone, nonyl decyl ketone, didecyl ketone, etc. It is understood that the ketones may be of straight or branched chain configuration. Ketones are available commercially or they may be synthesized as required. A number of ketones and particularly the higher boiling ketones are available as mixtures which are either products or byproducts of commercial operations. These mixtures generally are available at compartively low cost and, as another advantage of the present invention, the mixtures may be used without the added time and expense of separating specific compounds in pure state. One such mixture available commercially is "Stearone" which is diheptadecyl ketone.

The reductive alkylation of the ketone and alkylenepolyamine is effected in any suitable manner. The reaction is effected using at least two moles of ketone per mole of alkylenepolyamine and generally an excess of the ketone, which may range up to about twenty mole proportions of ketone per one mole proportion of alkylenepolyamine, is employed to insure complete reaction. In one embodiment the reaction is effected in the presence of hydrogen and a suitable reductive alkylation catalyst in one step, which may be either continuous or batch type operation. Any suitable reductive alkylation catalyst is employed including those containing nickel, platinum, palladium, etc., preferably composited with a suitable support. A particularly preferred catalyst comprises a composite of platinum and alumina, which may or may not contain combined halogen. The platinum generally is present in the catalyst in a concentration of from about 0.1 to about 2% by weight of the final catalyst and the halogen, when present, is in a concentration of total halogen of from about 0.01% to about 1% by weight of the final catalyst, the halogen preferably comprising fluorine and/or chlorine. Another suitable catalyst comprises an intimate mixture of copper oxide, chromium oxide and barium oxide. When using the platinum catalyst, the temperature generally will be within the range of from about 90° to about 260° C. and a hydrogen pressure of from about 100 to about 3000 pounds per square inch or more.

In a continuous type operation, the catalyst is disposed as a fixed bed in a reaction zone and the alkylenepolyamine, ketone and hydrogen, at the required temperature and pressure, are passed through the catalyst in either upward or downward flow. The reactor effluent is separated into a hydrogen stream and unreacted products, all or part of which may be recycled to the reaction zone, and the desired terminally alkylated alkylenepolyamine is separated from other high boiling products, if any. In a batch type operation, the alkylenepolyamine, ketone and catalyst are disposed in a reaction zone which is pressured with hydrogen and then heated to the desired temperature. After cooling, the products are separated to recover the desired terminally alkylated alkylenepolyamine. While the one-step process generally is preferred, it is understood that the reaction may be effected in two steps. In the first step, effected in the absence of hydrogen, the Schiff's base is first prepared and then is hydrogenated in a separate step to form the desired terminally alkylated alkylenepolyamine.

The terminally alkylated alkylenepolyamine, prepared in the above manner, then is subjected to oxyalkylenation. The oxyalkylenation is readily effected by charging the terminally alkylated alkylenepolyamine into a reaction zone and passing alkylene oxide, particularly ethylene oxide, into contact with the alkylenepolyamine. The alkylene oxide will be used in a proportion of at least one mole thereof per each nitrogen atom in the alkylenepolyamine. For example, when N,N'-dialkyl-ethylenediamine is to be oxyalkylated, at least two moles of alkylene oxide are used per mole of ethylenediamine. Usually an excess of the alkylene oxide is employed in order to insure complete reaction. This reaction readily occurs at a low temperature which may range from room temperature to 150° C. in the absence of a catalyst. As hereinbefore set forth, ethylene oxide is preferred. Other alkylene oxides includes propylene oxide, butylene oxide, pentylene oxide, hexylene oxide, etc., as well as styrene oxide, epichlorohydrin, etc. It is understood that the R'' alkylene group may be substituted by such groups as phenyl, alkoxy, thiooxy, halo, hydroxy, etc. It will be noted that the alkylated alkylenepolyamine contains only secondary nitrogen atoms and accordingly the oxyalkylenation will result in each nitrogen atom containing only one oxyalkylene group.

The polyalkyl - polyhydroxyalkyl - alkylenepolyamine, prepared in the above manner, is reacted with a borylating agent. Any suitable borylating agent may be used. A particularly preferred borylating agent is boric acid. Other borylating agents include trialkyl borates in which the alkyl groups preferably contain from 1 to 4 carbon atoms each. In the use of the latter type borylating agent, the reaction is effected by transesterification and, accordingly, there is no advantage to using trialkyl borates containing more than 4 carbon atoms in each alkyl group, although the higher boiling trialkyl borates may be used when satisfactory and advantages appear therefor. Still other borylating agents include alkyl boric acid, dialkyl boric acid, boric oxide, boric acid complex, cycloalkyl boric acid, aryl boric acid, dicycloalkyl boric acid, diaryl boric acid or substitution products of these with alkoxy, alkyl and/or halo groups, etc.

The reaction of the borylating agent and polyalkyl-polyhydroxyalkyl-alkylenepolyamine is effected in any suitable manner. The ortho-borates are formed by heating and stirring the reactants at a temperature up to about 100° C. and thus within the range of from about 60° to about 100° C. when using boric acid. The meta-borates are formed at temperatures above about 100° C. and thus may be within the range of from about 100° to about 200° C. or more. The higher temperature of from about 100° to about 200° C. is used when employing trialkyl borate in order to effect the transesterification reaction. In one method the reactants are refluxed in the presence of a solvent. Any suitable solvent may be used and advantageously comprises an aromatic hydrocarbon solvent including benzene, toluene, xylene, ethylbenzene, cumene, etc., n-hexane, n-heptane, n-octane, chlorinate hydrocarbons, etc., or mixtures thereof. The use of a solvent is particularly preferred when boric acid is used as the borylating agent. When using a trialkyl borate as the borylating agent, the solvent may be omitted. While no catalyst normally is required, a catalyst may be used when employing the trialkyl borate. Any suitable catalyst may be employed including sodium hydrogen sulfate, potassium hydrogen sulfate, tin oxide, polyalkyl tin derivatives, alkoxy tin derivatives, polyalkyl titanium derivatives, alkoxy titanium derivatives, trialkyl or trialkoxy aluminum, etc. The borylating agent and polyalkyl-polyhydroxyalkyl-alkylenepolyamine generally are used in a mole proportion within the range of from about 0.5 to 2 mole proportions of borylating agent per one mole proportion of polyalkyl-polyhydroxyalkyl-alkylenepolyamine.

In another embodiment, an alcohol, including aliphatic or aromatic alcohol or mercaptan including aliphatic or aromatic mercaptan, is included in the reaction charge to satisfy one or two of the valences of the boron. When used, the alcohol or mercaptan is employed in an amount of from about 0.5 to 2 mole proportions thereof per one mole proportions of the polyalkyl-polyhydroxyalkyl-alkylenepolyamine. Preferred aliphatic alcohols include methanol, isopropanol, butanol, sec-butyl alcohol, pentanol, hexanol, heptanol, octanol, nonanol, decanol, undecanol, dodecanol, tridecanol tetradecanol, pentadecanol, hexadecanol, heptadecanol, octadecanol, nonadecanol, eicosanol, etc. Preferred aromatic alcohols include phenol, cresol, xylenol, etc. The alcohol or aromatic phenol moiety may be substituted with alkoxy groups or thioalkoxy groups. Prefererd mercaptans include butyl mercaptan, pentyl mercaptan, hexyl mercaptan, heptyl mercaptan, octyl mercaptan, nonyl mercaptan, decyl mercaptan, undecyl mercaptan, dodecyl mercaptan, etc., and thiophenol, thiocresol, thioxylenol, etc.

As hereinbefore set forth, the reaction is readily effected by refluxing the borylating agent and polyalkyl-polyhydroxyalkyl-alkylenepolyamine, with or without solvent and/or catalyst as required. Refluxing is continued until the required amount of water when using boric acid or alcohol when using trialkyl borate is collected. Following completion of the reaction, the solvent and alcohol, if any, are removed by vacuum distillation. The borated polyalkyl-polyhydroxyalkyl-alkylenepolyamine is recovered as a liquid and used as such or, when desired, the product may be retained in the solvent and used as such or the product may be prepared as a solution in a different solvent and used in this manner.

As hereinbefore set forth, the exact composition of the product has not been established. When the polyalkyl-polyhydroxyalkyl-alkylenepolyamine is a polyalkyl-polyhydroxyalkyl-ethylenediamine, probable compounds may include one or more of the following as monomer or recurring units: (1)

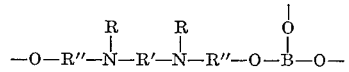

(2) a cyclic configuration in which each of the oxygens of the hydroxyl group are attached to a boron atom and the third valence is otherwise satisfied, (3) a polycyclic structure similar to that described in (2) joined by the —B—O—B— linkage, (4) compound in which each of the hydrogens of the hydroxyl groups are replaced with a

(5) compounds having boroxine configuration and (6) metaborates.

Because of the uncertainty as to the actual composition of the product, these products are being claimed generically and by their method of manufacture.

From the above description, it will be seen that a number of different compounds are included within the scope of the present invention, but that all of these products are borates of compounds of specific chemical configuration, in which the terminal nitrogen atoms are each substituted with an alkyl group and each nitrogen atom is substituted with a hydroxyalkyl group. It is understood that the different compounds are not necessarily equivalent in their activity or use for the same or different purposes and that a mixture of the different compounds may be used in the present invention.

The novel compounds of the present invention possess varied utility. As hereinbefore set forth, they are of especial utility in substrates exposed to weather and in this embodiment the compounds of the present invention serve as weathering stabilizers. Although the mechanism in which these compounds function is not completely understood, these compounds serve to protect substrates which undergo ultraviolet light induced oxidation. In addition, the compounds of the present invention possess anti-static properties and adhesion improving properties. The compounds are also effective as antioxidants, peroxide decomposers and bactericides. Furthermore, they are of ready solubility in most substrates. The substrates normally subject to exposure to weather include plastics, resins, paints, varnishes, other coatings, fibers, textiles, etc.

Illustrative plastics which are stabilized by the novel compounds of the present invention include polyolefins and particularly polyethylene, polypropylene, polybutylene, mixed ethylene propylene polymers, mixed ethylene butylene polymers, mixed propylene butylene polymers, etc. The solid olefin polymers are used in many applications including electrical insulation, light weight outdoor furniture, awnings, cover for greenhouses, fibers, etc. In many of these applications the solid olefin polymer is exposed to sunlight and air.

Another plastic being used commercially on a large scale is polystyrene. The polystyrene type resins are particularly useful in the manufacture of molded or machined articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), rayon, etc. (Here again, deterioration occurs due to ultraviolet light and oxidation. In addition, the additives of the present invention may serve as dye sites in plastics. This is especially desirable in plastics used for textiles as, for example, use of plastics for carpeting, fabrics, etc. Furthermore, the additives of the present invention inhibit discoloration and, therefore, the color of the product will remain true, which also is of considerable advantage in the case of clear products.

Still other plastics are prepared from other monomers and are available commercially. Illustrative examples of such other solid polymers include polycarbonates, phenol-formaldehyde resins, urea-formaldehyde resins, melamine-formaldehyde resins, acryloid plastics which are derived from methyl, ethyl and higher alkyl acrylates and methacrylates as monomers used in the polymerization. Other polymers include polyacetals, especially polyformaldehydes such as "Delrin" and "Celcon." Still other substrates include vinyl, acrylic, nitrocellulose based coatings; especially cellulose acetate, cellulose acetate butyrate, ethyl cellulose, etc. Still other substrates are polyesters, including linear or cross-linked, reinforced polyesters, laminate polyesters, etc., various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR copolymer of butadiene and styrene), Buna N (copolymer of butadiene and acrylonitrile), butyl rubber (copolymer of butadiene and isobutylene), neoprene rubber (chloroprene polymer), Thiokol rubber (polysulfide), silicone rubber, etc. The natural rubbers include hevea rubber, caoutchouc, balata, gutta percha, etc. It is well known that rubber undergoes deterioration due to oxygen and, when exposed to direct sunlight for extended periods of time, also undergoes deterioration from this source.

The above illustrative examples of various plastics and resins which are improved by the additives of the present invention. As hereinbefore set forth, still other substrates include paints, varnishes, drying oils, pigments, rust preventive coatings, wax coatings, protective coatings, etc. It is understood that the compounds of the present invention may be used in any coating which is subject to exposure to ultraviolet light, oxidation, heat, etc. While the compounds are especially useful in materials subject to such exposure, it is understood that the compounds of the present invention also may be used advantageously in other coatings, plastics, resins, paints, etc., which normally are not exposed outdoors.

The compounds of the present invention also are of utility as additives in other organic substrates including, for example, hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. In the oils, the compounds of the present invention serve to inhibit oxidative deterioration, thermal deterioration, etc., thereby retarding and/or preventing sediment formation, dispersion of sediment when formed, preventing and/or retarding discoloration, rust or corrosion inhibitor, detergent, etc.

In many applications it is advantageous to utilize the compounds of the present invention in conjunction with other additives. For example, particularly improved results are obtained in the stabilization of plastics, apparently due to a synergistic effect, when the compound of the present invention is used in admixture with a phenolic antioxidant including particularly 2,6-ditertiary-butyl-4-methylphenol. Other inhibitors which may be used generally will be of the phenolic or amine type and include phenyl-alpha-naphthylamine, phenyl-beta-naphthylamine, phenothiazine, Nonox WSP, Nonox Cl, dialkylated phenols, trialkylated phenols including 2,4-dimethyl-6-tertiarybutylphenol, etc., Santonox R, Santowhite, alkyl-alkoxyphenols, 2246 (2,2'-methylene-bis-(4-methyl-6-tert-butylphenol) and 425 (2,2'-methylene-bis-(4-ethyl-6-tert-butylphenol) (American Cyanamid), diphenyl - p - phenylenediamine, 1,1,3 - tris-(2 - methyl-4-hydroxy-5-t-butylphenyl)-butane, 703 (2,6-di-tert-butyl-alpha-dimethylamino-p-cresol) (Ethyl Corporation), 4,4'-bis - (2-methyl-6-tert-butylphenol); 4,4'-thio - bis-(6-tert-butyl-O-cresol); 4,4'-bis-(2,6-di-tert-butylphenol); 4,4'-methylene-bis-(2,6-di-tert-butylphenol); Salol (salicylic acid esters), p-octyl-phenylsalicylate, various phosgene alkylated phenol reaction products, various alkoxyalkyl-dihydroxybenzophenones, polyalkyldihydroxybenzophenones, tetrahydroxybenzophenones, 2,4,5 - trihydroxybutyrophenone, etc., and especially such hydroxybenzophenones as 2,2'-dihydroxy-4-octoxybenzophenone, 2,2'-dihydroxy-4-decoxybenzophenone, 2,2-dihydroxy-4-dodecoxybenzophenone, 2,2'-dihydroxy-4-octadecoxybenzophenone, etc., in general any alkoxy or cycloalkoxy substituted 2,2'-dihydroxybenzophenone, 2-hydroxy-4'-octoxybenzophenone, 2-hydroxy - 4' - decoxybenzophenone, 2-hydroxy-4'-dodecoxy, etc., and in general any alkoxy or cycloalkoxy substituted 2-hydroxybenzophenone. Other ultraviolet light stabilizers include nickel-bis-dithiocarbamates, nickel-bis-dihydroxypolyalkylphenol sulfides, especially [2,2' - thiobis-(4-t-octylphenolato)]-n-butyl-amine nickel (II), dilauryl beta-mercaptodipropionate, dihydroxytetralkyl sulfides, dihydroxytetralkyl methanes, various trihiophosphites as trilaurylthiophosphite, dialkyl-phosphites, trialkylphosphites, high molecular weight nitriles, various Mannich bases, various N-hydroxyphenyl-benzotriazoles such as 2-(2'-hydroxy-5'-octylphenyl)-benzotriazole, 2-(2'-hydroxy-5'-dodecylphenyl)-benzotriazole, 2-(2'-hydroxy-5'-octoxyphenyl)-benzotriazole, 2-(2'-hydroxy-5'-dodecoxyphenyl) - benzotriazole, Tinuvin 326, etc., in general, any alkyl or alkoxyphenyl substituted benzotriazole, etc. The additional inhibitor may be used in a concentration of from about 1% to about 75% by weight of the compound of the present invention. Generally, the additional inhibitor will be used in a concentration within the range of from about 0.001% to about 3% and more particularly from about 0.01% to about 2% by weight of the substrate.

The additive of the present invention will be used in a stabilizing concentration which will depend upon the particular substrate. The additive may be used in a concentration as low as 0.0001% to about 25% but generally will be used in a concentration of from about 0.01% to about 5% by weight of the substrate. When used in hydrocarbon distillate and particularly gasoline, the additive generally is used in a concentration of from about 0.0001% to about 0.5%. The additive is incorporated in the substrate in any suitable manner. For example, when it is incorporated into a plastic, resin or the like, it may be added to the hot melt with stirring, generally in a Banbury mixer, extruder or other device. When it is added to a liquid, it is incorporated into the liquid with intimate stirring. When it is added to a multi-component mixture as, for example, grease, it may be added to one of the components and, in this manner, incorporated into the final mix or it may be added directly into the final mix.

The additive of the present invention may be utilized as such or prepared as a solution in a suitable solvent including alcohols and particularly methanol, ethanol, propanol, butanol, etc., hydrocarbons and particularly benzene, toluene, xylene, cumene, Decalin, etc.

The following examples are introduced to illustrate further the novelty and utility of the present invention but not with the intention of unduly limiting the same.

EXAMPLE I

The compound of this example was prepared by reacting 1 mole proportion of boric acid with 1 mole proportion of N,N'-di-sec-octyl-N,N'-di-(2-hydroxyethyl)-ethylenediamine and 1 mole proportion of isodecyl alcohol. The N,N'-di-sec-octyl-N,N'-di-(2-hydroxyethyl)-ethylenediamine was prepared by reacting N,N'-bis-(1-methylheptyl)-ethylenediamine with 2 mole proportions of ethylene oxide. The oxyethylenation was effected by intimately mixing the reactants in a turbomixer at a temperature of about 115° C. and a pressure of about 250 p.s.i. for about two hours. The product was recovered as a liquid boiling at 188° C. at 0.4 mm. Hg and having an index of refraction $n_D^{20}$ of 1.4705, basic nitrogen content of 5.37 meq./g., hydroxy content of 4.5 meq./g. and a G.L.C. purity of 98%.

The borylation was effected by heating and refluxing a mixture of 107.5 g. (0.25 mole) of the N,N'-di-sec-octyl-N,N'-di-(2-hydroxyethyl)-ethylenediamine, 39.5 g. (0.25 mole) of isodecyl alcohol, 15.45 g. (0.25 mole) of boric acid and 200 g. of benzene solvent. A total of 13.5 cc. of water was collected. The benzene solvent was removed by distilling at 175° C. under a vacuum of 18 mm. Hg. The product was recovered as a liquid having a basic nitrogen of 3.86 meq./g. and a percent boron of 1.85% by weight.

EXAMPLE II

The compound of this example was prepared by reacting tri-n-butyl borate with N,N'-di-sec-octyl-N,N'-di-(2-hydroxyethyl)-ethylenediamine. The latter compound was prepared in substantially the same manner as described in Example I. This is a transesterification reaction and was effected by heating and refluxing 37.2 g. (0.1 mole) of N,N'-di-sec-octyl-N,N'-di-(2 - hydroxyethyl)-ethylenediamine and 45.8 g. (0.2 mole) of tri-n-butyl borate. No solvent was employed in this preparation and the temperature of reaction ranged from 140° to 170° C. A total of 27 g. of butanol fraction was collected, the butanol resulting from the transesterification reaction. Following completion of the reaction, the reaction mixture was distilled at 170° C. under a vacuum of 18 mm. Hg. The borated product was recovered as a liquid having a boron content of 2.81 weight percent. This corresponds to the theoretical boron content of 3.16% by weight of a compound in which each hydroxyl group of the N,N'-di-sec-octyl-N,N'-di(2 - hydroxyethyl)-ethylenediamine undergoes transesterification reaction with separate tributyl borate molecules to form a compound in which each of the boron atoms is attached to two butoxy radicals and to one ethoxy radical of the N,N'-di-sec-octyl-N,N'-di-(2-hydroxyethyl)-ethylenediamine. As hereinbefore set forth, the formation of this compound has not been definitely established.

EXAMPLE III

The compound of this example is prepared by the reaction of equal mole proportions of $N^1,N^3$-di-sec-octyl-$N^1$, $N^2,N^3$-tri-(2 - hydroxyethyl)-diethylenetriamine and boric acid. The $N^1,N^3$-di-sec-octyl-$N^1,N^2,N^3$-tri-(2-hydroxyethyl)-diethylenetriamine is prepared by reacting 1 mole proportion of $N^1,N^3$-bis(1-ethyl-3-methylpentyl)-diethylenetriamine with 3 mole proportions of ethylene oxide in a turbomixer at a temperature of about 100° C. for about 4 hours. $N^1,N^3$-di-sec-octyl-$N^1,N^2,N^3$-tri-(2 - hydroxyethyl)-diethylenetriamine is recovered as a light colored liquid having a boiling point of 233–235° C. at 0.5 mm. Hg, a basic nitrogen content of 6.58 meq./g. and a hydroxyl content by acetylation method of 5.75 meq./g.

The reaction of the $N^1,N^3$-di-sec-octyl-$N^1,N^2,N^3$-tri-(2-hydroxyethyl)-diethylenetriamine and boric acid is effected by heating and refluxing the mixture in the presence of benzene solvent until the theoretical amount of water is collected. Following completion of the reaction, the reaction product is distilled under vacuum to remove benzene solvent and to recover the borylated product as a liquid.

EXAMPLE IV

The compound of this example is prepared by reacting equal mole proportions of boric acid and $N^1,N^3$-di-sec-pentatriacontyl-$N^1,N^2,N^3$-tri-(2-hydroxyethyl)-diethylenetriamine under refluxing conditions at a temperature of 134° C. in the presence of xylene solvent. The heating and refluxing is continued until the desired amount of water is collected indicating the formation of metaboric acid derivative or formation of boroxine, and the product is recovered as a solution in the xylene solvent.

EXAMPLE V

The compound of this example is prepared by heating and refluxing a mixture of 1 mole proportion of boric acid, 1 mole proportion of N,N'-di-sec-butyl-N,N'-di-(2 - hydroxypropyl)-ethylenediamine and 1 mole proportion of butyl mercaptan in the presence of benzene solvent. The heating and refluxing is continued until the reaction is completed and the product then is subjected to vacuum distillation to remove the benzene solvent. The product is recovered as a liquid and may be used as such or formed as a solution in a suitable solvent.

EXAMPLE VI

As hereinbefore set forth, the compound of the present invention is useful as a weathering agent in plastics. The plastic of this example is solid polypropylene. The solid polypropylene without inhibitor is stated to have properties substantially as follows:

Table I

| | |
|---|---|
| Specific gravity | 0.910–0.920 |
| Refractive Index, $n_D^{25}$ | 1.510 |
| Heat distortion temperature: | |
| At 66 p.s.i. load ° C | 116 |
| At 264 p.s.i. load ° C | 66 |
| Tensile yield strength (ASTM D–638–58T) (0.2″ per min.) p.s.i. | 4700 |
| Total elongation, percent | 300–400 |
| Stiffness, flexural (ASTM D747–50) $10^5$ p.s.i. | 1.8 |
| Shore hardness (ASTM D676–55T) | 74D |

The polypropylene was milled in a two-roll heated mill of conventional commercial design and the additive, when employed, was incorporated in the sample during the milling. The samples were pressed into sheets of about 17 mil thickness and cut into plaques of about 1⅜″ x 1½″. The plaques were inserted into plastic holders, affixed onto a rotating drum and exposed to carbon arc rays at about 52° C. in a Weather-Ometer. The samples were examined periodically by infrared analysis to determine the carbonyl band at 1715 cm.$^{-1}$ which is reported as the "carbonyl number". The higher intensity of the carbonyl band indicates a higher carbonyl concentration (expressed as carbonyl number) and accordingly increased deterioration.

A sample of the polypropylene without inhibitor developed a carbonyl number of greater than 1000 within 120 hours of exposure in the Weather-Ometer. Another sample of the same polypropylene containing 0.15% by weight of 2,6-ditertiarybutyl-4-methylphenol developed a carbonyl number over 1000 within 360 hours of exposure in the Weather-Ometer.

Another sample of the solid polypropylene containing 1% by weight of the borated compound of Example I and 0.15% by weight of 2,6-ditertiarybutyl-4-methylphenol was evaluated in the Weather-Ometer in the same manner. This sample now has been exposed for 1080 hours in the Weather-Ometer and the carbonyl number is only 230. As another important advantage of the additive of the present invention, the sample of polypropylene containing this additive, even after exposure in the Weather-Ometer for this long period of time, still remained clear and did not undergo discoloration.

EXAMPLE VII

The plastic of this example is solid polyethylene of the high density type. An inhibited product of this polyethylene is marketed commercially under the trade name of Fortiflex by the Celanese Corporation of America. A special batch of this polyethylene free of inhibitor is obtained and is cut into plaques in the same manner described in Example VI and evaluated in the Weather-Ometer. A sample of this polyethylene without inhibitor, when evaluated in the Weather-Ometer, increases from a carbonyl number of 28 to a carbonyl number of 855 within 624 hours. In contrast, another sample of the polyethylene containing 1% by weight of the borated compound of Example II does not develop a carbonyl number of above 800 for a considerably longer period of time.

EXAMPLE VIII

The additive of Example III is incorporated in a concentration of 1% by weight in polystyrene and serves to inhibit deterioration of the polystyrene upon exposure to weathering.

EXAMPLE IX

The compound of Example I is used in a concentration of 0.3% by weight as an additive in gasoline and serves to improve the combustion characteristics of the gasoline, as well as serving as an anti-static agent therein.

I claim as my invention:

1. A solid polymer selected from the group consisting of polyolefins and polystyrene containing from about 0.001% to about 25% by weight of a borate of a polyalkyl-polyhydroxyalkyl-alkylenepolyamine of the following formula:

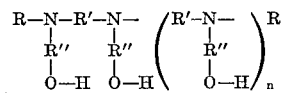

where R is an alkyl group of from 4 to about 50 carbon atoms, R' is an alkylene group of from 2 to about 6 carbon atoms, R" is an alkylene group of from 2 to about 6 carbon atoms and $n$ is an integer of from 0 to 4.

2. The composition of claim 1 wherein said borate is a borate of N,N'-di-sec-alkyl - N,N'-di(hydroxyalkyl)-ethylenediamine.

3. The composition of claim 1 containing from about 0.01% to about 5% by weight of the borate.

4. The composition of claim 3 also containing from about 0.01% to about 2% by weight of a phenolic antioxidant.

5. The composition of claim 1 being solid polyolefin.

6. The polyolefin of claim 5 wherein the polymer is a polyethylene.

7. The polyolefin of claim 5 being polypropylene.

References Cited

UNITED STATES PATENTS

| | | | |
|---|---|---|---|
| 2,970,130 | 1/1961 | Fingstone | 260—462 |
| 3,011,881 | 12/1961 | Emrick et al. | 260—462 |
| 3,103,531 | 9/1963 | Bramam | 260—462 |
| 3,257,442 | 6/1966 | Woods et al. | 260—462 |
| 3,227,739 | 1/1966 | Versteel | 260—462 |

DONALD E. CZAJA, *Primary Examiner.*

HOSEA E. TAYLOR, *Assistant Examiner.*

U.S. Cl. X.R.

44—72; 106—16, 186; 252—51.5, 392, 403; 260—41, 45.75, 45.8, 45.85, 45.95, 398.5, 462, 666.5, 999